United States Patent
Pappalardo et al.

(10) Patent No.: US 6,927,441 B2
(45) Date of Patent: Aug. 9, 2005

(54) VARIABLE STAGE CHARGE PUMP

(75) Inventors: Domenico Pappalardo, Gravina di Catania (IT); Maurizio Gaibotti, Cesano Maderno (IT); Gaetano Palumbo, Catania (IT); Antonino Conte, Tremestieri Etneo (IT); Stefano Lo Giudice, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 22 days.

(21) Appl. No.: 10/050,427

(22) Filed: Jan. 15, 2002

(65) Prior Publication Data

US 2002/0163376 A1 Nov. 7, 2002

Related U.S. Application Data

(60) Provisional application No. 60/277,491, filed on Mar. 20, 2001.

(51) Int. Cl.[7] .......................... H01L 27/10; H02M 3/18
(52) U.S. Cl. .................. 257/299; 327/536; 363/60
(58) Field of Search .................... 257/213, 288, 257/296, 299; 327/524, 530, 534, 535, 536; 363/13, 59, 60; 438/239, 379

(56) References Cited

U.S. PATENT DOCUMENTS

| | | | | |
|---|---|---|---|---|
| 5,483,434 A | * | 1/1996 | Seesink | 363/60 |
| 5,581,454 A | * | 12/1996 | Collins | 363/59 |
| 5,767,735 A | * | 6/1998 | Javanifard et al. | 327/536 |
| 5,912,560 A | * | 6/1999 | Pasternak | 324/536 |
| 6,121,821 A | * | 9/2000 | Miki | 327/536 |
| 6,150,835 A | * | 11/2000 | Hazen et al. | 326/38 |
| 6,198,645 B1 | * | 3/2001 | Kotowski et al. | 363/59 |
| 6,369,642 B1 | * | 4/2002 | Zeng | 327/536 |
| 6,504,422 B1 | * | 1/2003 | Rader et al. | 327/536 |
| 2002/0130701 A1 | * | 9/2002 | Kleveland | 327/536 |

FOREIGN PATENT DOCUMENTS

| | | | | | |
|---|---|---|---|---|---|
| GB | 2296605 A | * | 7/1996 | | H02M/3/07 |
| JP | 07111095 A | * | 4/1995 | | G11C/16/06 |

* cited by examiner

Primary Examiner—Carl Whitehead, Jr.
Assistant Examiner—Jennifer M. Dolan
(74) Attorney, Agent, or Firm—Lisa K. Jorgenson; E. Russell Tarleton; Seed IP Law Group PLLC (57) ABSTRACT

A variable charge pump contains several individual simple charge pumps, each with a pumping capacitor and a switching mechanism. Additionally, a switching network is coupled to the individual charge pumps so that the different lines in the charge pump can be connected together in a serial mode or parallel mode (or mixed serial and parallel modes) to match the needs of the output load. The switching network is easily changed to provide the necessary driving capability as the needs of the output load changes.

39 Claims, 11 Drawing Sheets

| N | $F_1$ | $F_2$ | $F_3$ | $F_4$ | $F_5$ | $F_6$ |
|---|---|---|---|---|---|---|
| 1 | F | F | F | F | F | F |

| N | $F_{T1}$ | $F_{T2}$ | $F_{T3}$ | $F_{T4}$ | $F_{T5}$ | $F_{T6}$ | $F_{T12}$ | $F_{T13}$ | $F_{T14}$ | $F_{T15}$ | $F_{T16}$ | $F_{T17}$ |
|---|---|---|---|---|---|---|---|---|---|---|---|---|
| 1 | $\bar{F}$ | $\bar{F}$ | $\bar{F}$ | $\bar{F}$ | $\bar{F}$ | $\bar{F}$ | F | F | F | F | F | F |

| N | $F_1$ | $F_2$ | $F_3$ | $F_4$ | $F_5$ | $F_6$ |
|---|---|---|---|---|---|---|
| 2 | F | F | F | $\overline{F}$ | $\overline{F}$ | $\overline{F}$ |

| N | $F_{T2}$ | $F_{T4}$ | $F_{T6}$ | $F_{T7}$ | $F_{T9}$ | $F_{T11}$ | $F_{T13}$ | $F_{T15}$ | $F_{T17}$ |
|---|---|---|---|---|---|---|---|---|---|
| 2 | $\overline{F}$ | $\overline{F}$ | $\overline{F}$ | F | F | F | $\overline{F}$ | $\overline{F}$ | $\overline{F}$ |

| N | F₁ | F₂ | F₃ | F₄ | F₅ | F₆ |
|---|----|----|----|----|----|----|
| 3 | F | F | $\overline{F}$ | $\overline{F}$ | F | F |

| N | F_{T2} | F_{T4} | F_{T7} | F_{T8} | F_{T10} | F_{T11} | F_{T15} | F_{T17} |
|---|--------|--------|--------|--------|---------|---------|---------|---------|
| 3 | $\overline{F}$ | $\overline{F}$ | F | $\overline{F}$ | F | $\overline{F}$ | F | F |

| $\left(\frac{V_{out}}{V_{dd}}\right)_{min}$ | $\left(\frac{V_{out}}{V_{dd}}\right)_{max}$ | $O_1$ | $O_2$ | $N_1$ | $N_0$ |
|---|---|---|---|---|---|
| 1.3 | 1.5 | 0 | 0 | 0 | 1 |
| 1.5 | 2.0 | 1 | 0 | 1 | 0 |
| 2.0 | 3.3 | 1 | 1 | 1 | 1 |

VARIABLE STAGE CHARGE PUMP

BACKGROUND OF THE INVENTION

1. Field of the Invention

The present invention relates to variable stage charge pumps, and, more specifically, to a charge pump that has a selectable number of stages.

2. Description of the Related Art

In some electronic devices, the power supply voltage is not high enough to guarantee the correct operation of the circuit. In these cases, higher voltages are required. For example, voltages up to 15 volts are needed for programming and erasing operations in a non-volatile memory device.

When a voltage higher than the power supply voltage is required, a second power supply can be furnished from outside the circuit. Until a few years ago, this was the only solution available. Presently, the required voltages can be also generated inside the integrated circuit. On-circuit high voltage generation is now more widespread than off-chip generation, because of lower implementation cost.

A circuit that can provide higher voltage values than the power supply is typically called a charge pump.

Figure 1:
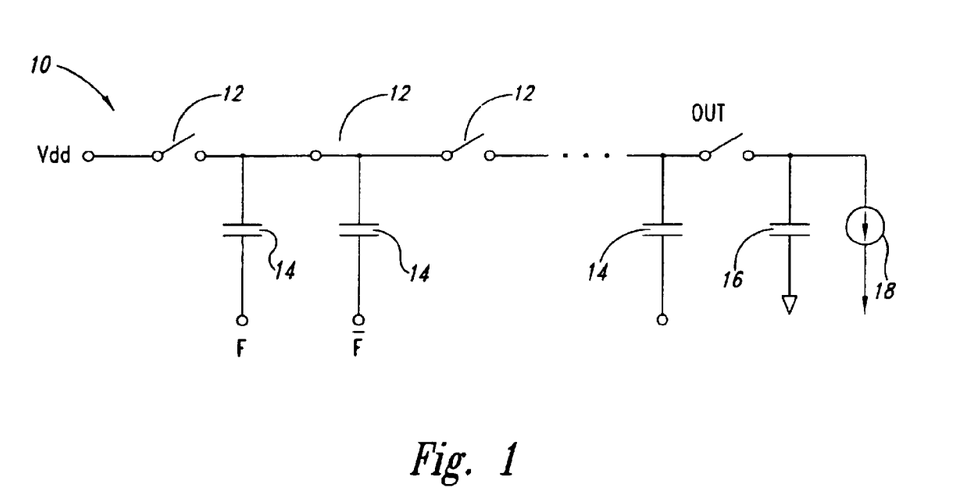
FIG. 1 is a schematic diagram of a charge pump according to the prior art.

FIG. 1 shows, in a simplified manner, an N-stage charge pump 10, each stage comprising a switch 12 and a pumping capacitor 14. Additionally a load capacitance 16 and a load current 18 are shown. The integration area of the charge pump is very large and it increases when the current output must be high.

The current output from a charge pump can be determined as follows:

$$I_L = \frac{(N+1) \cdot V_{dd} - V_{OUT}}{N^2} \cdot C_{TOT} \cdot f \tag{1}$$

where,

N is the number of charge pump stages;
Vdd is the power supply voltage;
Vout is the output voltage;
$C_{TOT}$ is the total capacitance value of all pumping capacitors; and
f is the switching frequency.

In order to make the output current equal to the current required by the load, the pumping frequency f, is varied from 0 Hz to $f_{MAX}$.

Therefore, the maximum current value for an N-stage charge pump is:

$$I_{LMAX} = \frac{(N+1) \cdot V_{dd} - V_{OUT}}{N^2} \cdot C_{TOT} \cdot f_{MAX} \tag{2}$$

The power supply voltage Vdd can be of any value within a given fixed range. The output voltage Vout is related to the load driven in a given time by the charge pump. The capacitors that make up $C_{TOT}$ require the largest part of the integration area of the charge pump In order to maximize the current output from the charge pump, with the same amount of occupied area (and thus the same $C_{TOT}$) and with the same maximum frequency, $f_{MAX}$, the number of stages N can be opportunely chosen.

As described in *Optimization of Word-Line Booster Circuits for Low-Voltage Flash Memories*—IEEE Journal of Solid-State Circuits, Vol. 34, No. 8, August 1999, the number of stages N for which the current output has the maximum value is:

$$N_{OPT} = 2 \cdot \left(\frac{V_{OUT}}{V_{dd}} - 1\right) \tag{3}$$

As seen from equation 3, the number of stages is dependent on the power supply voltage, Vdd, and the output voltage $V_{OUT}$. The supply voltage may not be known at the time the charge pump is designed, and output voltage, $V_{OUT}$ have different requirements at different times, for example in order to drive different loads. Both of these unknown values makes it difficult to accurately design a suitably sized charge pump. If the number of stages chosen is too few, the necessary output current may not be able to be achieved; if the number of stage chosen is too many, valuable integrated circuit area (for the unnecessary extra capacitors) is wasted.

SUMMARY OF THE INVENTION

Embodiments of the invention are directed to a charge pump that has a variable number of stages. This allows the output current to be maximized for a given integration area by selecting the number of stages to use in the charge pump. Additionally, embodiments of the invention allow the charge pump to be reconfigured if the power supply voltage or the output voltage specifications change.

Presented is a variable stage charge pump that includes a number of individual units. Each of the units has a number of switch and capacitor circuits coupled between an input terminal and an output terminal to make up the individual unit. Additionally, the charge pump includes a switching network that can be selected to combine different individual units of the charge pump so that they can work in either a parallel mode or a serial mode. In some embodiments, the switching network is made by switches with connections that can be kept open during a pumping operation. Some embodiments include a switching network made from a switched diode. A method of driving the charge pump and the switching network is also presented.

The invention can be embodied in many different ways. The following figures and description explain the invention with reference to different embodiments thereof, but the invention is not limited to those embodiments shown.

DETAILED DESCRIPTION OF THE PREFERRED EMBODIMENTS

According to embodiments of the invention, a variable stage charge pump can be obtained by dividing the total capacitance, $C_{TOT}$, from equations 1 and 2, into a suitable number of pumping capacitors, and connecting these pumping capacitors together through a suitable switching network. The switching network acts on the frequencies of the pumping capacitors and on the frequency of the switching drivers to decide the appropriate number of stages in the charge pump.

Figure 2:
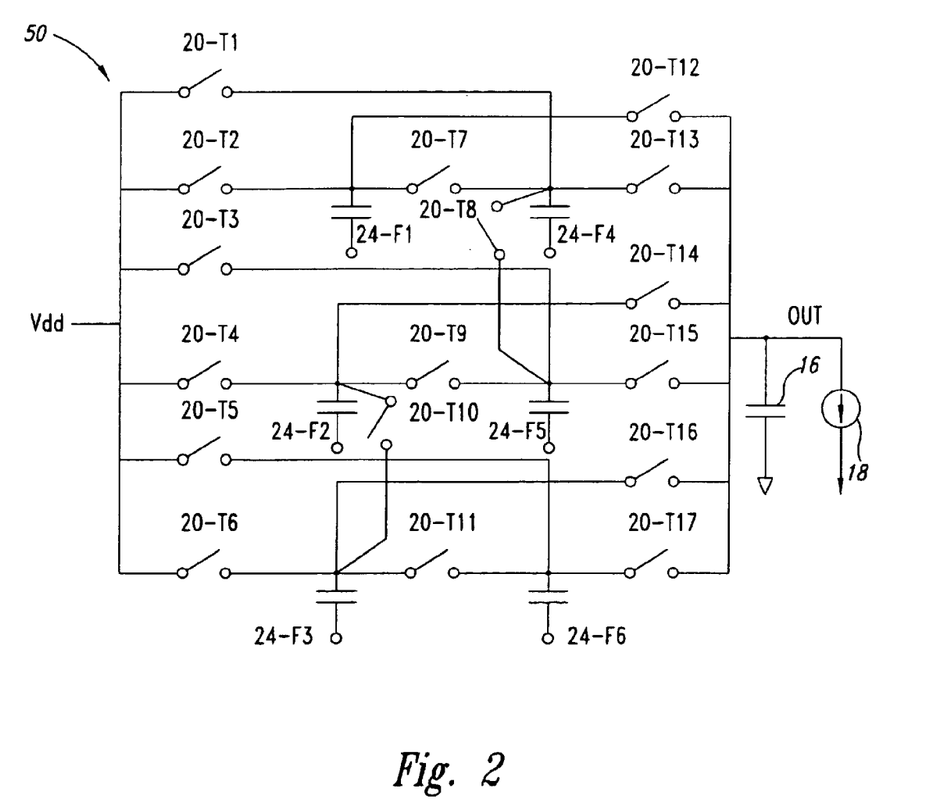
FIG. 2 is a schematic diagram of an example charge pump according to an embodiment of the invention.

FIG. 2 is a schematic diagram of an example charge pump 50 according to an embodiment of the invention. The charge pump 50 includes between 1 and 3 stages, depending on a configuration of its switching network. The charge pump 50 includes a number of switches 20, individually labeled T1–T17, and a number of capacitors 24, individually labeled F1–F6. Each of the switches 20 is individually controllable to either an open or shut position, although they are all shown in FIG. 2 as being open. Also included in the charge pump 50 are the power supply voltage Vdd and the output load capacitance 16 and current 18.

Figure 3A:
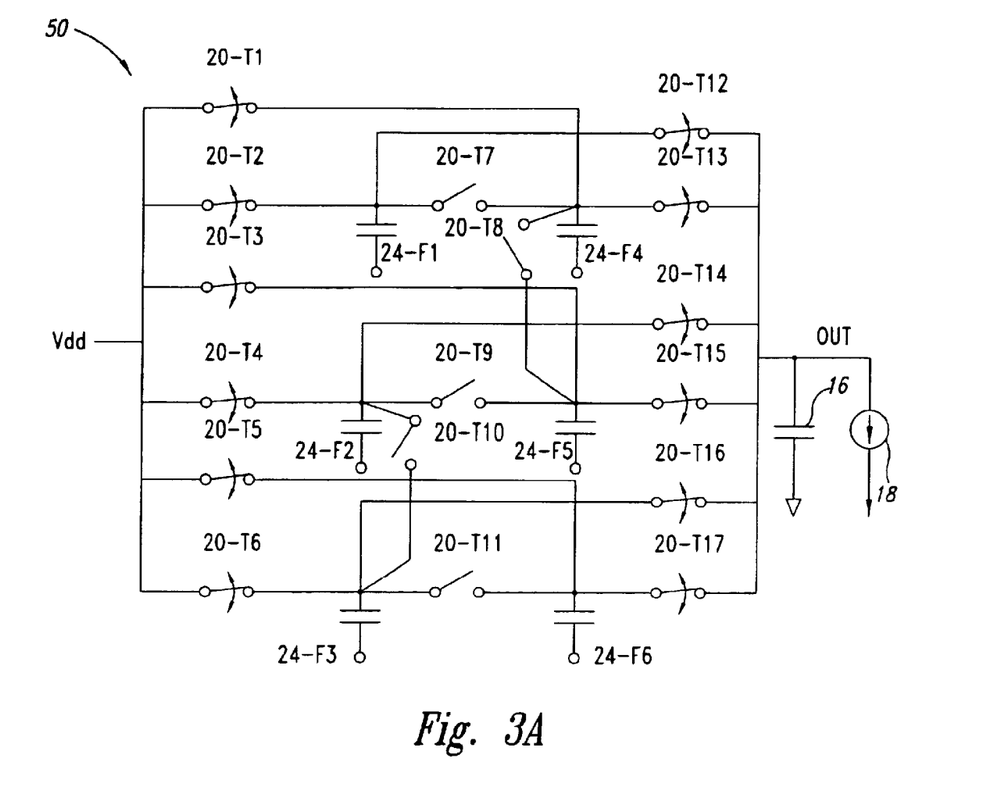
FIG. 3A is a schematic diagram showing states of an example switch network of the charge pump shown in FIG. 2.
Figure 3B:
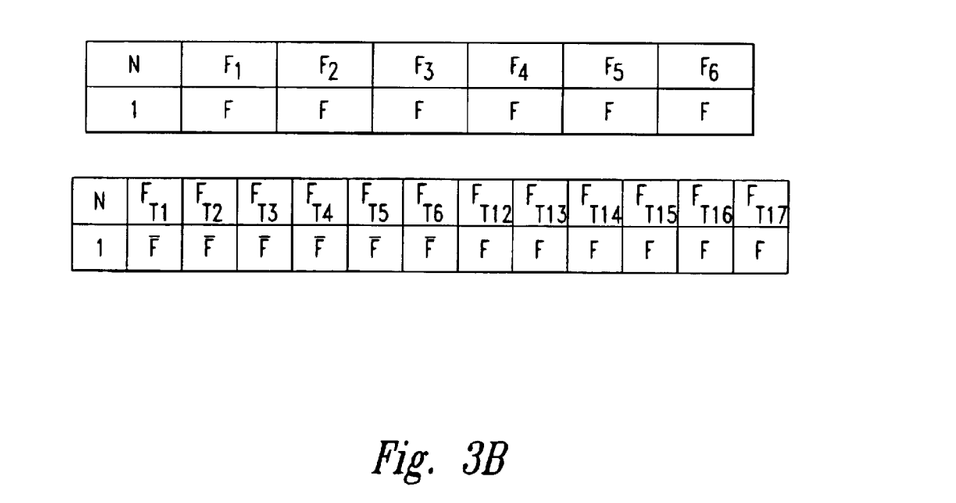
FIG. 3B is a chart showing the phases of the switches shown in FIG. 3A.

The charge pump 50 is shown in FIG. 3A with the switches T7, T8, T9, T10, and T11 fixed open (no arrow through the switch symbol). The remaining switches 20 are switchable either to an open or closed position by an appropriate signal in an appropriate phase. If the capacitors F1–F6 and the remaining switches 20 in FIG. 3 are driven by means of the phase values according to FIG. 3B, the charge pump 50 works as a charge pump having a single stage of 6 parallel charge pumps. The phase diagram of FIG. 3B can be explained as follows. An "F" representation in the boxes marked F1–F6 means that an in-phase signal is provided to the open terminal of the respective capacitors F1–F6. An "F" representation in the boxes marked $F_{T1}$–$F_{T17}$ means that an in-phase signal is provided to the switches T1–T17, and causes them to close. Conversely, an $\overline{F}$ symbol in the respective box means that the open terminal of the respective capacitor is driven with an out of phase signal, or that the switch is driven to an open position. As stated above, with the charge pump 50 of FIG. 3A driven with the phases as shown in FIG. 3B, results in a single stage, 6-parallel pump charge pump.

Figure 4A:
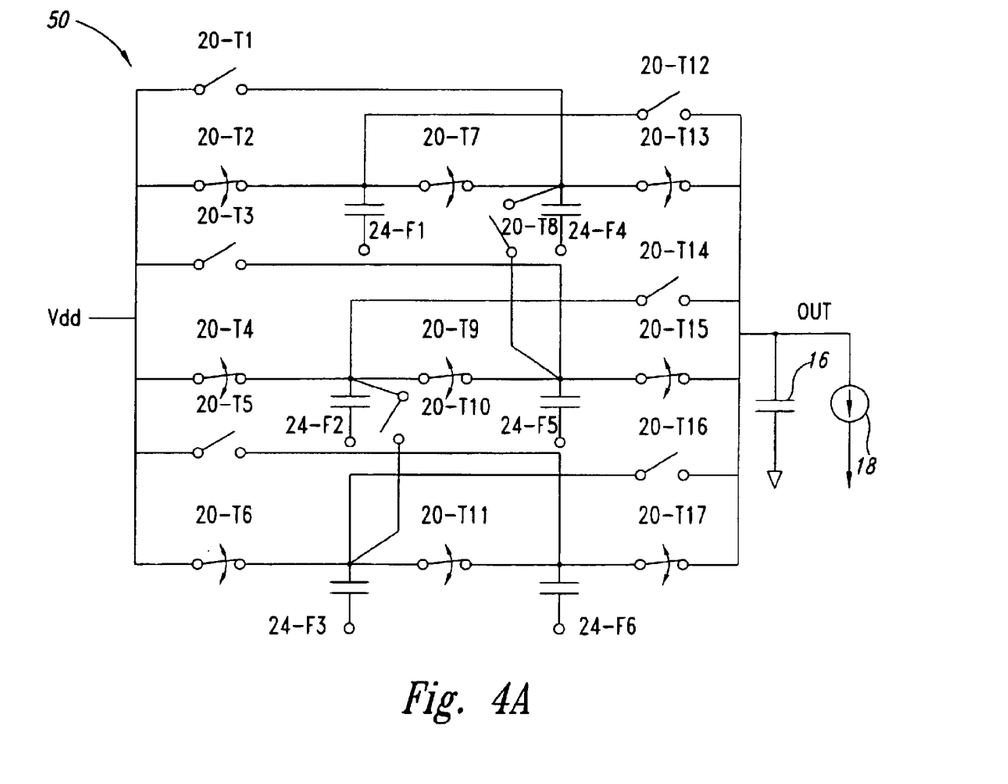
FIG. 4A is a schematic diagram showing states of an example switch network of the charge pump shown in FIG. 2.
Figure 4B:
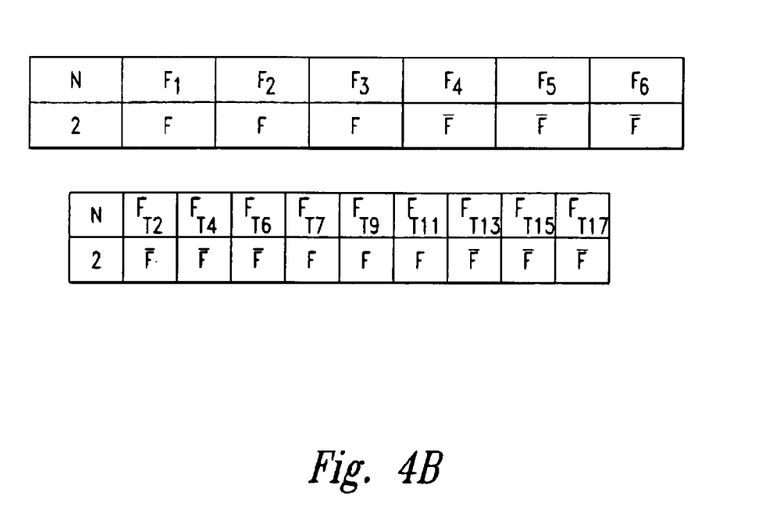
FIG. 4B is a chart showing the phases of the switches shown in FIG. 4A.

The same charge pump 50 is shown in FIG. 4A with a different configuration. In that figure, switches T1, T3, T5, T8, T10, T12, T14 and T16 are held open, while the remainder are driven by the phase signals as shown in FIG. 4B. In this configuration, with the phase signals as shown in FIG. 4B, the charge pump 50 operates as a charge pump having two stages, with 3 charge pumps in parallel.

Figure 5A:
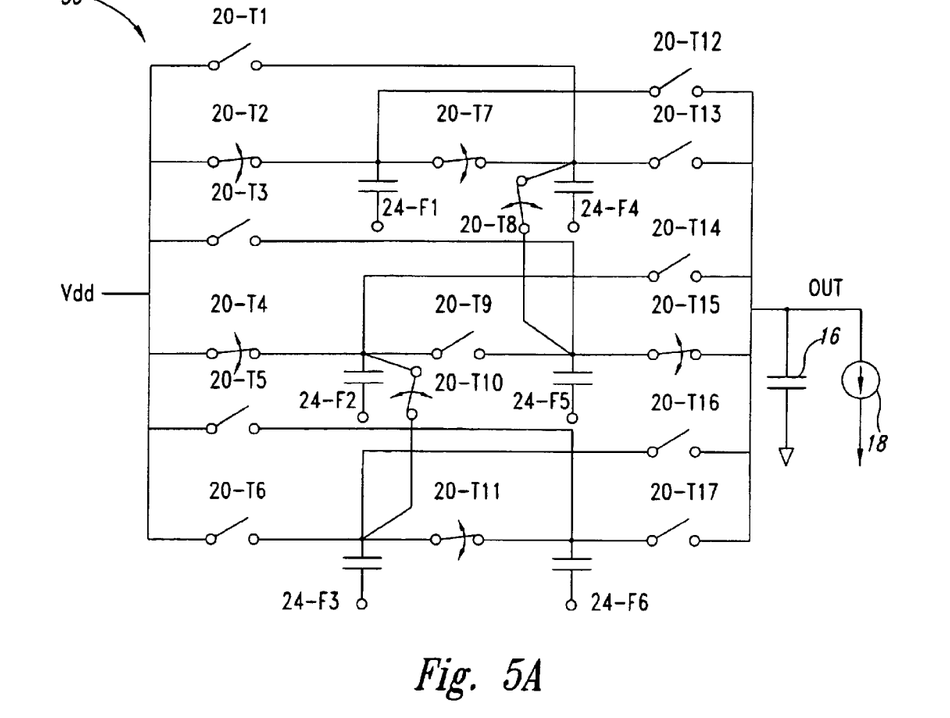
FIG. 5A is a schematic diagram showing states of an example switch network of the charge pump shown in FIG. 2.
Figure 5B:
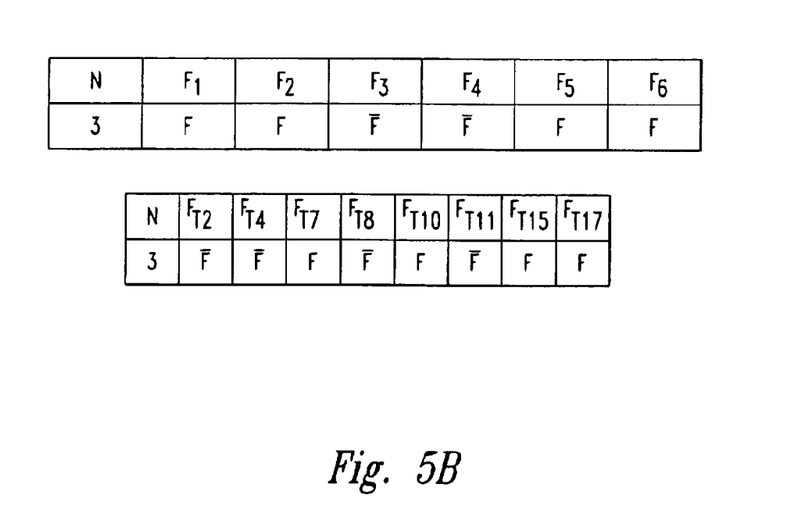
FIG. 5B is a chart showing the phases of the switches shown in FIG. 5A.

The same charge pump 50 is shown in FIG. 5A with a still a different configuration. In that figure, switches T1, T3, T5, T6, T9, T12, T13, T14, and T16 are held open, while the remainder are driven by the phase signals as shown in FIG. 5B. In this configuration, with the phase signals as shown in FIG. 5B, the charge pump 50 operates as a charge pump having three stages, with 2 charge pumps in parallel.

Figure 6:
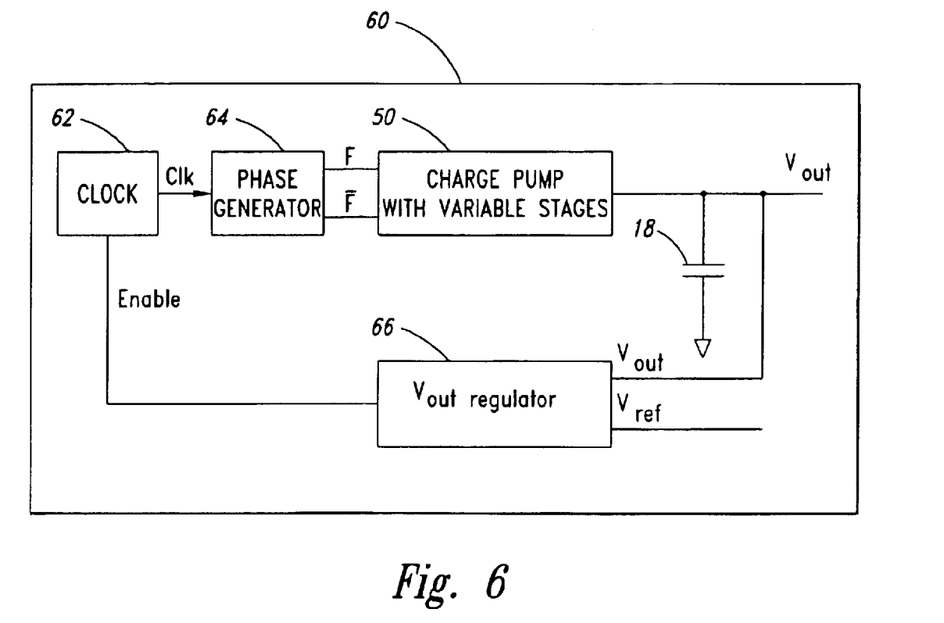
FIG. 6 is an example block diagram of a circuit including a charge pump according to an embodiment of the invention and other sub-circuits used in conjunction with the charge pump.

A charge pump with fixed or variable stages cannot work alone, and requires other circuitry for correct operation, for instance a control circuit. FIG. 6 is an example block diagram of a circuit 60 including a charge pump 50 and other sub-circuits to ensure the correct operation of the charge pump. The circuit 60 includes a clock generator 62, a phase generator 64, which provides the required phases to drive the switches and the pumping capacitors in the charge pump 50, and a $V_{OUT}$ regulator 66, which maintains the output voltage at a fixed value in the best possible way.

Figure 7:
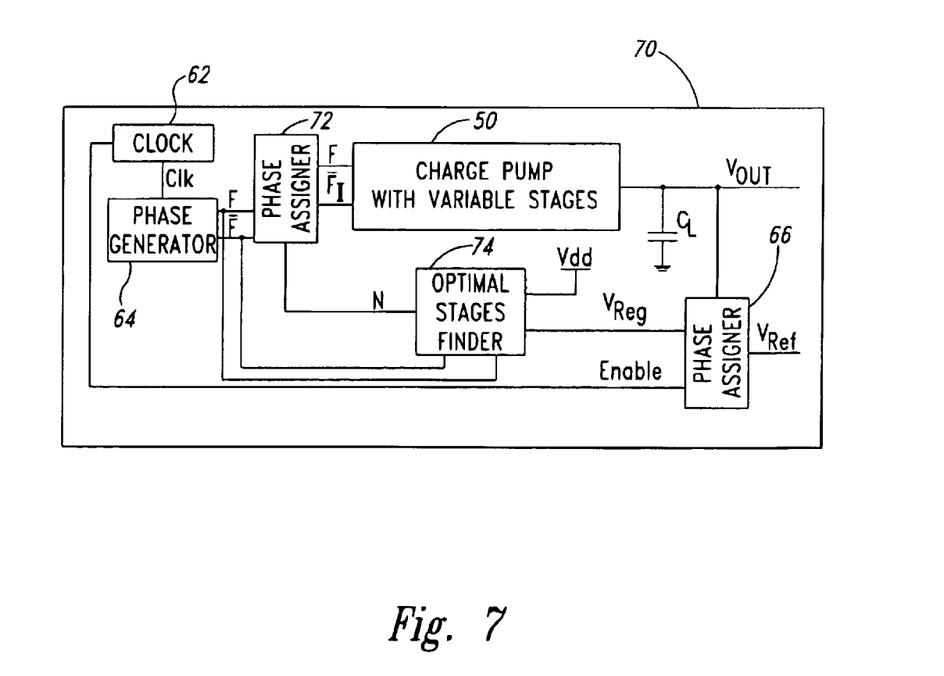
FIG. 7 is an example block diagram of a circuit including a charge pump according to an embodiment of the invention and other sub-circuits used in conjunction with the charge pump.

A charge pump having variable stages needs two additional circuits, as shown in the block diagram of FIG. 7, given by way of an example. In FIG. 7, a circuit 70 includes the clock generator 62, the phase generator 64 and the output voltage regulator 66 as in the circuit 60 of FIG. 6. Additionally the circuit 70 includes a phase assigner 72, which assigns the phases generated by the phase generator 64 to the switches and pumping capacitors in the charge pump 50 such that the charge pump has the desired number of stages. Further, the circuit 70 includes an optimal stages finder 74, which uses the power supply voltage, Vdd, and the output voltage, $V_{OUT}$ (or a regulation voltage, $V_{REG}$), received at its inputs, and provides the number of stages N which guarantees the maximum output current from the circuit 70.

Figure 8:
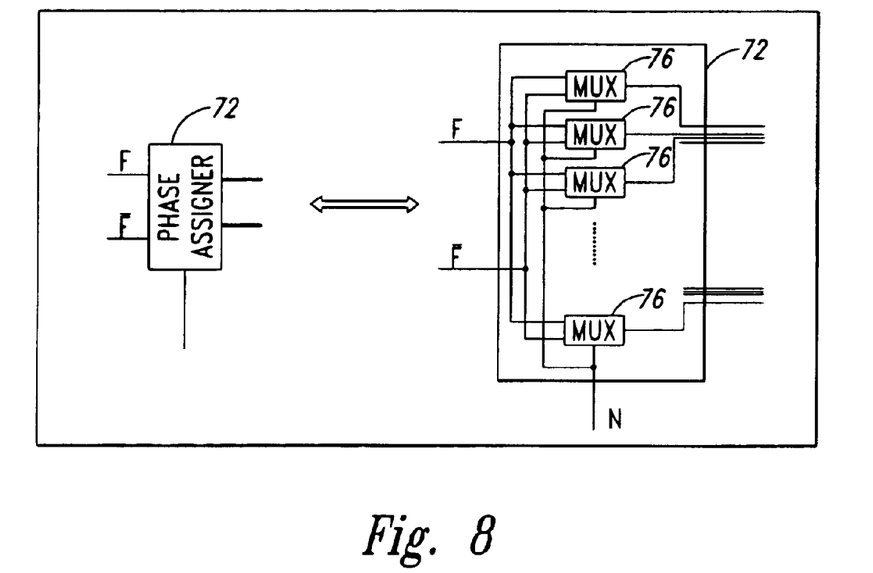
FIG. 8 is a block and schematic diagram of an example phase assigner shown in FIG. 7.

The phase assigner 72 can be made, for example, by several multiplexers 76, which act as phase selecting switches. A preferred embodiment includes the same number of multiplexers 76 as there are capacitors and switches to be driven in the charge pump 50, as shown with reference to FIG. 8. Each multiplexer 76 receives, as input, a signal for the number of phase conditions that can be used, in this case F and $\overline{F}$. Additionally, the multiplexer 76 receives a selection, N, that determines which phases will be passed on to the capacitors and switches to be driven in the charge pump 50.

Figure 9:
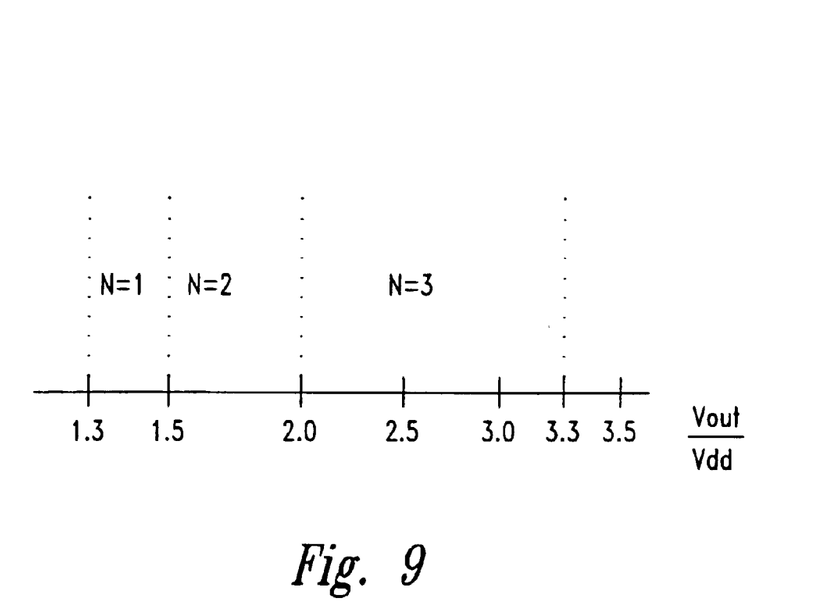
FIG. 9 is a graph showing how the number of phases in the charge pump is preferably assigned.

Using the equation (3), it is possible to define the optimal number of stages when the $$\frac{V_{OUT}}{V_{dd}}$$

rate varies, as shown, in FIG. 9. That figure shows the supply voltage $V_{dd}$ varying between 1.5 and 3.7 V, and $V_{OUT}$=5V. From FIG. 9, it is clear that knowing the ratio with respect to 1.5 and 2.0 allows the optimal value of N to be obtained. As seen in the figure, if the ratio is less than 1.5, the optimal value of N is 1; if the ratio is between 1.5 and 2, the optimal value of N is 2, and if the ratio is over 2, the optimal value of N is 3.

Figure 10A:
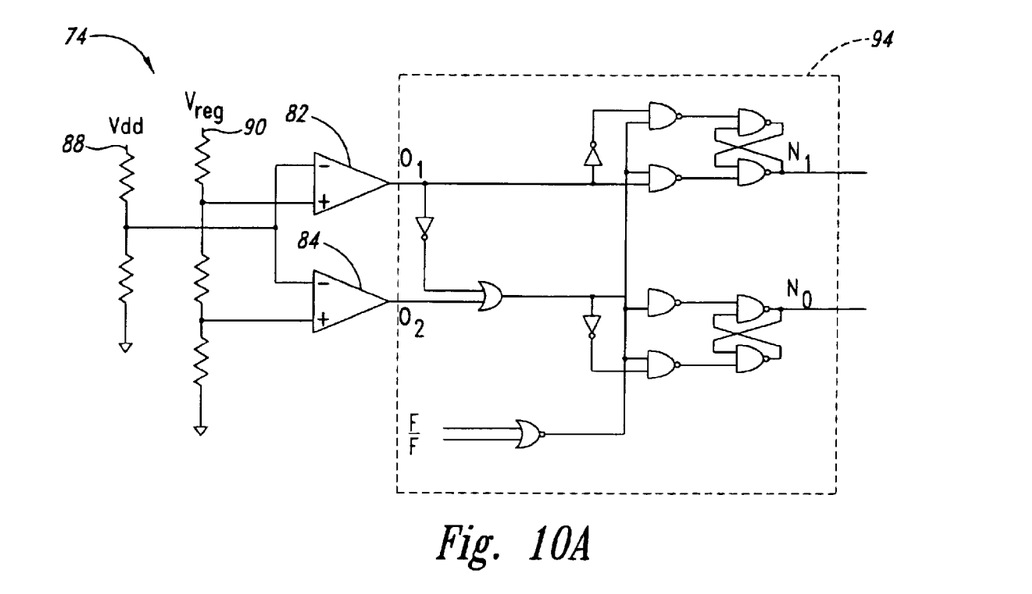
FIG. 10A is a schematic diagram of an example embodiment of the optimal stages finder shown in FIG. 7.

A possible embodiment of the optimal stages finder 74 is shown in FIG. 10A. In that embodiment, the optimal stages finder includes a first and a second comparator, 82 and 84, which have their inverting inputs tied together and to a resistor ladder 88. Non-inverting inputs of the comparators are coupled to different nodes in a second resistor ladder 90. The resistor ladder 88 is coupled to the Vdd power supply voltage, while the resistor ladder 90 is coupled to the Vreg, the regulating voltage shown in FIG. 7.

Figure 10B:
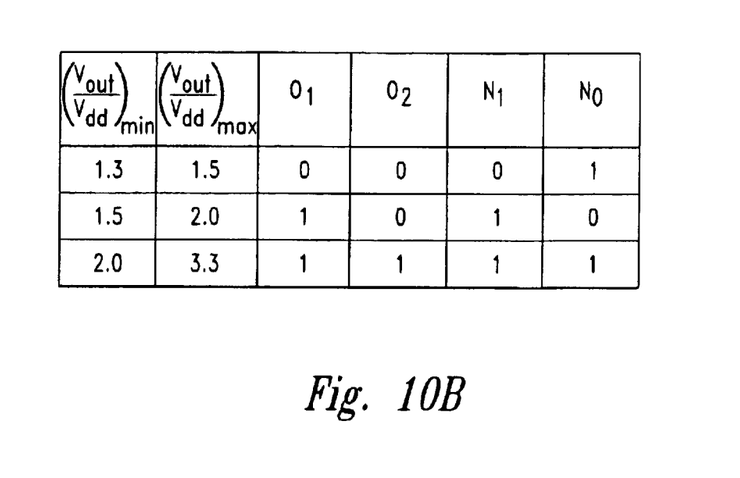
FIG. 10B is a chart showing the outputs of the optimal stages finder shown in FIG. 10A.

A logic circuit 94 is coupled to the output of the comparators 82 and 84, and is structured to output the optimum value for N, either 1, 2 or 3, in a value composed of the signals on the lines N1 and N0, according to the table shown in FIG. 10B.

Figure 11:
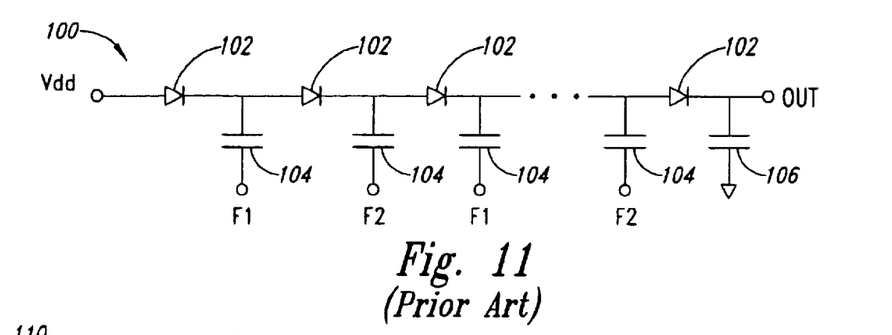
FIG. 11 is a schematic diagram of a charge pump according to the prior art.

A further embodiment of a charge pump having a variable number of stages is shown in FIGS. 11–16. In FIG. 11, a basic charge pump 100 is shown, similar to the one shown in FIG. 1. However, diodes 102 have been substituted where there were switches 12 in FIG. 1. Pumping capacitors 104 are also included in the charge pump 100, as well as a load capacitor 106.

Figure 12:
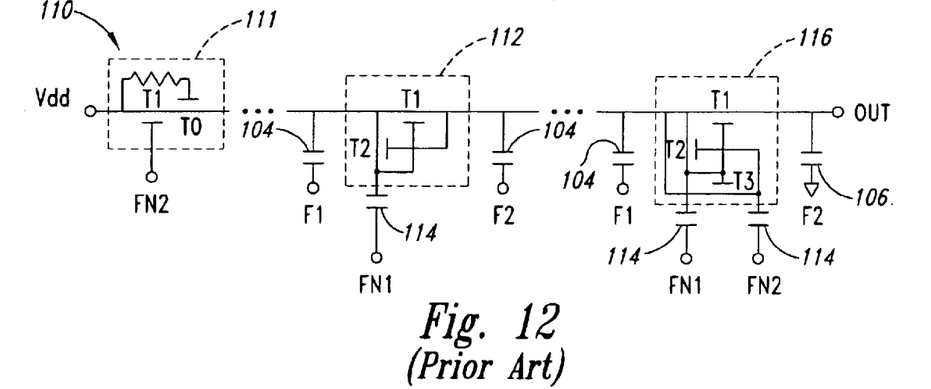
FIG. 12 is a detailed schematic diagram of the charge pump of FIG. 11.

A more detailed schematic diagram of the charge pump 100 is shown in FIG. 12. In that diagram, a charge pump 110 replaces the diodes 102 of FIG. 11 with a switched diode structure 112. These switched diodes 112 have only a very small voltage drop, on the order of tens of mV, instead of hundreds of mV as for a simple diode illustrated in FIG. 11.

In FIG. 12, the transistors T1 and T2 that make up the switched diode structure 112 are natural MOS transistors having a very low threshold (about 100 mV). In this way, the final stages do not reach threshold voltages comparable to Vdd, because of the body effect.

The transistor T1 is suitably sized in such a way to let flow all of the current to be transferred in a half-clock-period and to provide for a $V_{DS}$ that is as small as possible. Transistor T2 is used to switch T1 in the inverse diode configuration when the following stage is boosted. Although FIG. 12 only shows one switched diode structure 112 outright, additional switched diode structures are shown by implication. Compared to FIG. 11, in the charge pump 110, each of the diodes 102 are replaced by the switched diode structure 112, except for the first and last diodes 102, which have special functions in the embodiment of the charge pump 110, as described herein.

Also included in the charge pump 110 of FIG. 12 are a number of boost capacitors 114. The boost capacitors 114 are suitably sized in such a way to provide for a transferring of the 90% of the voltage difference provided by a signal FN, and thus provides a correct "overdrive" to the transistor T1 of the switched diode structures 112 during a charge transferring phase.

The FN phase signal is made at a double voltage value with respect to the F phase signal of FIG. 11, for the voltage on T1, $V_{GS} \gg Vt$.

With respect to the connection to Vdd, the charge pump 110 includes a structure 111, and does not need a complete switched diode structure 112 there. Since the booster first node varies from Vcc to 2Vcc, the structure 111 only requires an additional diode T0 and, in order to gain a value equal to its threshold voltage, transistor T1 is driven by FN phase, in such a way to force diode operation in the inverted configuration.

On the contrary, the output stage is provided with an auxiliary structure, which emulates a subsequent stage in order to guarantee the switching-on of the transistor T2 during the phase, which follows the charge transferring to the output. The auxiliary structure includes a third transistor, T3 coupled between the capacitor Cb 114 and the stage before the output stage, as shown in FIG. 12.

Two or more charge pumps 110 can be connected in parallel in order to increase the driving capability. Generally speaking, two charge pumps operating with opposite phases are connected in parallel, in such a way that they alternatively provide an output current, with the additional advantage of doubling the output current and greatly reducing the required size of capacitor Cout for a same ripple.

Figure 13:
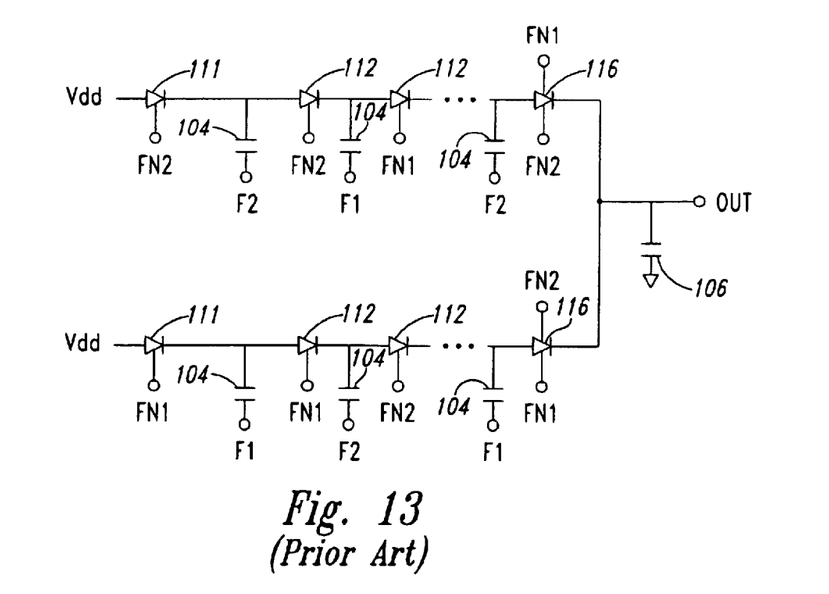
FIG. 13 is a schematic diagram of coupled charge pumps according to the prior art.

FIG. 13 shows an example of two charge pumps 110 operating with opposite phases and connected in parallel. Since the area required by each charge pump 110 is not negligible, it is possible to share the functions of two charge pumps. In one configuration, two charge pumps are configured in a parallel fashion, to create a low regulation voltage having a high driving capability. Also, two charge pumps can be configured in a serial fashion for a high regulation voltage having a low driving capability.

Figure 14:
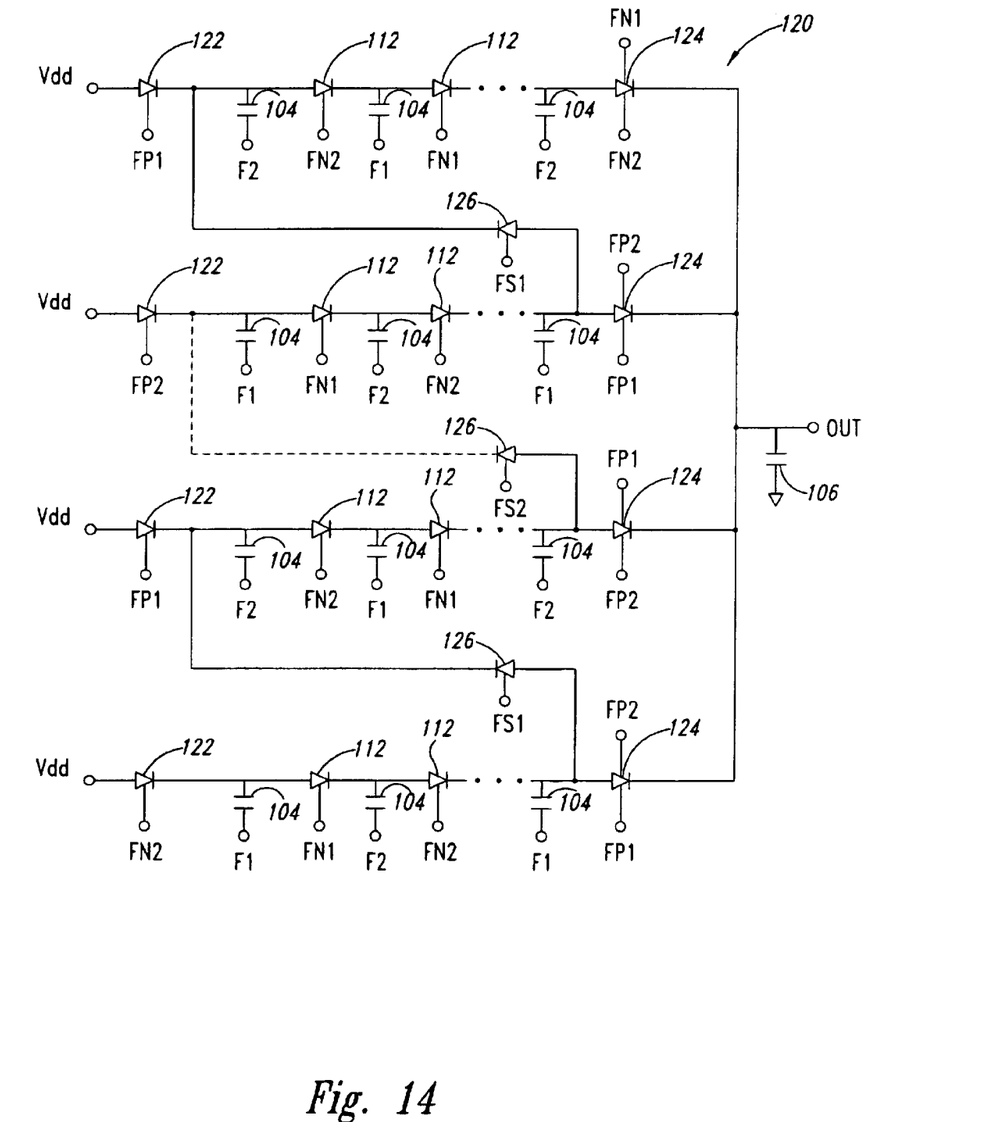
FIG. 14 is a schematic diagram of coupled charge pumps according to an embodiment of the invention.

FIG. 14 shows the basic operation scheme of a FP1 and FP2 correspond to the boosted phases, FN1 and FN2, for the parallel configuration, while they correspond to FS1 and FS2 for 0V. The charge pump of FIG. 14 differs from the prior art ones discussed with reference to FIGS. 11 and 12. Specifically, the charge pump 120 includes a Vdd connecting circuit 122, an output circuit 124, and an interconnection circuit 126. Detail of those circuits is shown in FIG. 15.

Figure 15:
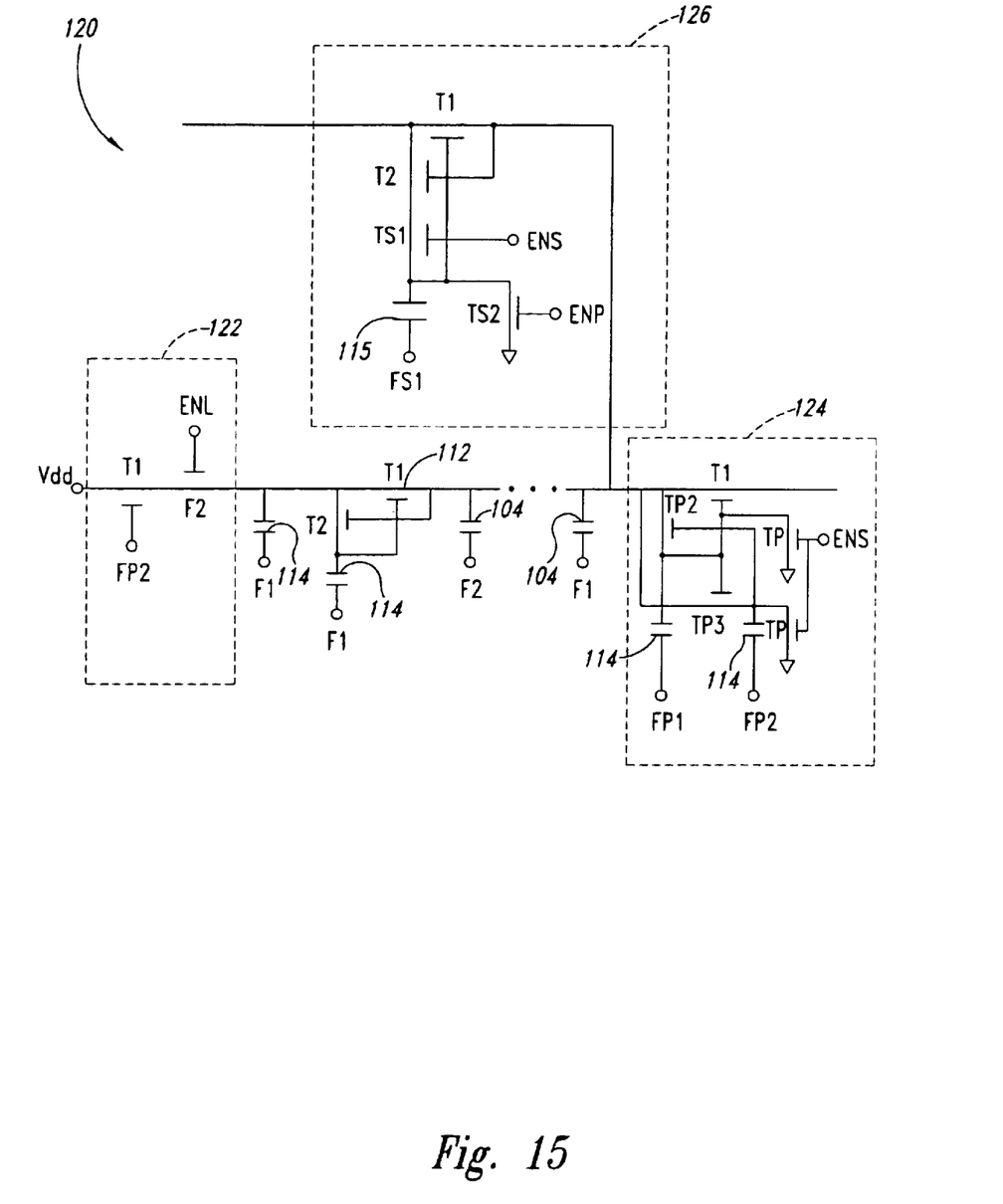
FIG. 15 is a detailed schematic diagram of circuits contained in the charge pumps of FIG. 14.

In the output circuit 124, the switch diodes TP2 and TP3, which correspond to the transistors T2 and T3 in FIG. 12, have a circuit structure as shown in FIG. 15. With respect to the known structures for switch diodes 116, suitable HV MOS transistors have been substituted, which have a high threshold (600 mV) in order to guarantee the complete switching-off of the structure, the operation during the on-phase being the same. This avoids having paths to ground throughout the low threshold transistors. The size of the transistors TP do not excessively charge the capacitors Cb.

As for the control signals that drive the circuits 126, 122 and 124, the control signal ENP is equal to the output voltage of the charge pump when the charge pump 120 is in the parallel configuration, while it is equal to zero when the charge pump is in the serial configuration. The control signal ENS has opposite signals. The signal ENL is equal to Vcc according to the parallel configuration, while it is equal to zero according to the serial configuration.

When in parallel configuration, signals ENL and ENP are high, while signals ENS, FS1 and FS2 are low. In this way, transistors T0 and TS2 are on, while transistors TP and TS1 are off. An auxiliary capacitor 115 has a first terminal coupled to one terminal of TS1 and the other terminal connected to the signal FS1 as shown in FIG. 15. Th TS1 switching-off guarantees the path-to-ground cut, since T2 and TS2 are on. The TS2 switching-on guarantees the T1 switching-off and thus the serial-path cut. The type of the transistor TS2 and TS3 does not affect the operating with respect to the structure comprising low threshold transistors, if they work with sufficient low voltages, but, according to their definition, they provide for a good overdrive of TS2 and TS3 for the voltages used in the parallel configuration.

In the serial configuration, the signal ENS is high, while signals ENL, ENP, FP1 and FP2 are low. In this way, transistors TS1 and TP are on, while transistors T0 and TS0 are off. Transistor TS1 shows an high overdrive, since it is driven by the output voltage of the charge pump and the voltage values at its ends are, in any case, lower for at least one stage. Also voltage values at the ends of TS2 are, in any case, well lower than the breakdown threshold. The switching-on of transistors TP guarantees the switching-off of transistors T1, TP2 and TP3 and thus the parallel-path cut.

The limits of the charge pump 120 are essentially due to the technology, which forces the threshold and breakdown voltages of the transistors. Additionally, there are limits on the power supply voltage Vdd and on the number of stages that can be formed.

A configurable booster has been formed in F6Y technology ($1.8V<Vcc>3.6V-Vb_{HV}=17V$) and the following performance have been obtained for Vcc=2.3V and f=10 MHz.

Parallel: $V_{out}=5.5V$; $I_{out}=240$ uA
Serial: $V_{out}=15V$; $I_{out}=60$ uA The known solution, according to equation (3) above, has the following results for the above-listed two cases:
1) n=3–Cp=20 pF;
2) n=12–Cp=5 pF;

The proposed solution can accomplish this by using only 5 pF capacitors, by changing when the charge pump 120 is operating in serial or parallel fashion, as can be seen with reference to FIG. 14.

In that figure, when the configuration is operating in parallel (to produce the lower output voltage with high driving capability), four boosters (each of the four lines) with three stages (three pumping capacitors 104) are needed, two by two operating in phase opposition. When the higher voltage is desired, the charge pump 120 can operate in serial mode, only one booster with 12 stages. In that configuration, the output of the first line (at the bottom of the figure) is passed to the input of the line above it, and so on, until the output from the top line is the output of the charge pump that is delivered to the output load.

Figure 16:
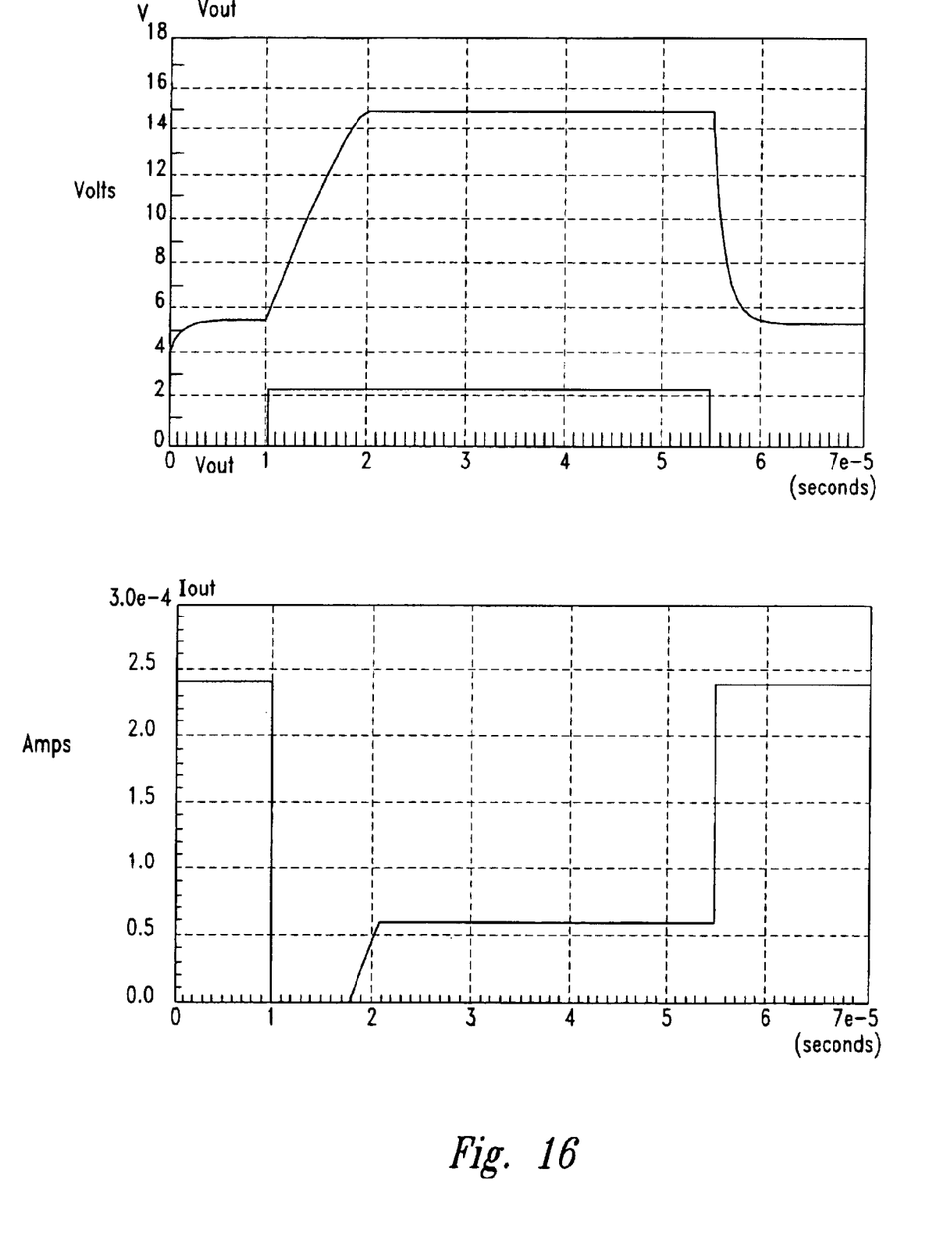
FIG. 16 is a timeplot of output from a realized version of the charge pump of FIG. 14.

The simulation results for a fabricated charge pump, for Vcc=2.3V, f=10 MHz and T=27° C. condition, are shown in FIG. 16.

The operating of such a circuit is guaranteed for the whole range for the power supply voltage allowed in technology F6Y, with frequencies less or equal than 20 MHz and temperature between −40° C. and 125° C., showing a maximum loss, in the worst conditions, equal to 10% of its driving capability.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

What is claimed is:

1. A charge pump capable of having multiple stages, comprising:
at least two pumping stages, each stage including:
an input terminal for accepting an input voltage,
an output terminal for delivering an output voltage, the output voltage different than the input voltage,
a first pumping capacitor having a first terminal coupled between the input and output terminals and having a second terminal structured to accept a first phase signal, and
a second pumping capacitor having a first terminal coupled between the input and output terminals and having a second terminal structured to accept a second phase signal, and
a first switch coupled between the input terminal and the output terminal and structured to disrupt a connection between the input and output terminals when activated by a switching signal;
a second switch coupled between the input terminal and the output terminal and structured to disrupt a connection between the input and output terminals when activated by a switching signal;
a third switch coupled between the first terminals of the respective first and second pumping capacitors and structured to disrupt a connection between the first terminals of the capacitors when activated by a switching signal; and
a pair of additional switches configured to separately couple the first and second pumping capacitors to the input and output lines such that for any pumping operation either one of the first and second pumping capacitors may selectively not be used;
the charge pump further including:
a switching network structured to couple the pumping stages either in a serial mode or a parallel mode depending on a state of the switching network.

2. The charge pump of claim 1 wherein there are at least four pumping stages, and the switching network comprises at least two switches.

3. The charge pump of claim 1 wherein some switches in the switching network and some of the switches in the pumping stages are structured to remain open during a charge pumping operation.

4. The charge pump of claim 1, further comprising:
a control circuit including an optimal stages finder couple to the switching network.

5. The charge pump of claim 4, further comprising a phase assigner coupled to the optimal stages finder, and comprising a plurality of multiplexing circuits.

6. The charge pump of claim 5 wherein some of the switches in the switching network and in the pumping stages are structured to remain open during a charge pumping operation, and wherein the number in the plurality of multiplexing circuits is the same as the number of capacitors in the pumping stages plus the number of switches that do not remain open during the pumping operation.

7. The charge pump of claim 4 wherein the optimal stages finder comprises a comparison circuit structured to compare a reference voltage to a power supply voltage and generate an output signal.

8. The charge pump of claim 7 wherein the comparison circuit comprises:
a first resistor ladder coupled to the power supply voltage;
a second resistor ladder coupled to the reference voltage; and
a set of comparators.

9. The charge pump of claim 8 wherein inputs of the comparators are coupled to the resistor ladders, and wherein outputs of the comparators are coupled to a signal latching circuit.

10. The charge pump of claim 9 wherein the signal latching circuit comprises:
a first input and a second input;
a first and a second latch; and
a logic circuit coupled between the first and second input and structured to provide a signal to the first and second latch based on a signal on the first and second input.

11. The charge pump of claim 10 wherein the logic circuit comprises an OR gate having a first input terminal coupled to the first input of the signal latching circuit, a second input terminal coupled to an inverted signal of the second input of the signal latching circuit, and having an output terminal coupled to the second latch.

12. The charge pump according to claim 1 wherein the first and second phase signals are identical to each other.

13. The charge pump according to claim 1 wherein the first and second phase signals are in opposite phase from each other.

14. The charge pump according to claim 1 wherein the relationship between the first phase signal and the second phase signal is controllable by software code to achieve a desired output response from the charge pump.

15. A variable stage charge pump, comprising:
a plurality of units, each unit including:
an input terminal and an output terminal;
a first switch coupled between the input terminal and a first terminal of a first capacitor, a second terminal of the first capacitor for receiving a pumping signal;
a second switch coupled between the input terminal and a first terminal of a second capacitor, a second terminal of the second capacitor for receiving a second pumping signal;
a third switch coupled between the first terminals of the first and the second capacitors;
a fourth switch coupled between the first terminal of the first capacitor and the output terminal; and
a fifth switch coupled between the first terminal of the second capacitor and the output terminal;
a plurality of phase selecting switches coupled to one of the capacitors in one of the units and structured to be coupled to one of the capacitors in another unit.

16. The charge pump of claim 15 wherein there are two units, and the phase selecting switch is coupled between the first terminal of the first capacitor of the first unit, and the first terminal of the first capacitor of the second unit.

17. The charge pump of claim 15 wherein the number of phase selecting switches in the second plurality is one less than the number of unit in the plurality of units.

18. The charge pump of claim 17 wherein there are a first, second and third units and a first and second phase selecting switches, and wherein the first phase selecting switch is coupled between the first terminal of the first capacitor of the first unit and the first terminal of the first capacitor of the second unit, and the second phase selecting switch is coupled between the first terminal of the second capacitor of the second unit and the first terminal of the second capacitor of the third unit.

19. The charge pump of claim 15, further comprising:
a control circuit including an optimal stages finder coupled to the switching network.

20. The charge pump of claim 19, further comprising a phase assigner coupled to the optimal stages finder and comprising a plurality of multiplexing circuits.

21. A charge pump capable of having multiple stages, comprising:
at least two pumping stages, each stage including:
an input terminal for accepting an input voltage,
an output terminal for delivering an output voltage, the output voltage different than the input voltage,
a pumping capacitor having a first terminal coupled between the input and output terminals and having a second terminal structured to accept a phase signal, and
a switched diode coupled between the input terminal and the output terminal and structured to disrupt a connection between the terminals when activated by a switching signal;
the charge pump further including:
a switching network coupled between the pumping stages and structured to couple the pumping lines either in a serial mode or a parallel mode depending on a state of the switching network, the switching network comprising:
a first transistor coupled between the pumping stages;
a second and a third transistor coupled between one of the pumping stages and a first terminal of an auxiliary capacitor; and
a fourth transistor coupled between the first terminal of the auxiliary capacitor and a reference voltage.

22. The charge pump of claim 21 wherein a control terminal of the second transistor is coupled to a signal that indicates the at least two lines of the charge pump should operate in a serial manner.

23. The charge pump of claim 21 wherein a control terminal of the fourth transistor is coupled to a signal that indicates the at least two lines of the charge pump should operate in a parallel manner.

24. The charge pump of claim 21 wherein a second terminal of the fourth transistor is structured to receive a phased signal.

25. The charge pump of claim 21, further comprising an output switched diode coupled to the output terminal.

26. The charge pump of claim 25 wherein the switched diode comprises:
an input terminal and an output terminal;
a first transistor coupled between the input terminal and output terminal;
a second transistor coupled between the input terminal and a first node and a first capacitor;
a third transistor coupled between the input terminal and a first node of a second capacitor;
a fourth transistor coupled between a control gate of the first transistor and a reference voltage; and
a fifth transistor coupled between the first node of the second transistor and the reference voltage.

27. The charge pump of claim 26 wherein the control gate of the fourth transistor and the control gate of the fifth transistor are coupled and driven with a signal that disconnects the output switched diode from the output terminal of the charge pump.

28. A method of connecting a set of pumping stages that include charge capacitors utilizing a plurality of switches forming a switching network, the method comprising:
accepting a voltage input signal at an input terminal;
applying a series of phase signals to the charge capacitors and applying phase signals to the switching network to separately couple any one of the charge capacitors to the input terminal and an output terminal such that for any pumping operation any combination of the charge capacitors may selectively not be used to produce an output voltage at the output terminal, the output voltage different than the input voltage; and
applying signals to the switching network coupled to the pumping stages, the signals for controlling whether the pumping stages should operate in a parallel or serial fashion.

29. The method of claim 28 wherein applying signals to the switching network comprises:
applying a signal to a switch coupled between two individual charge capacitors.

30. The method of claim 28 wherein applying signals to the switching network comprises:
   applying a first signal to a first switch coupled between a first and a second charge capacitor; and
   applying a second signal to a second switch coupled between the second charge capacitor and a third charge capacitor.

31. The method of claim 28 wherein applying signals to the switching network comprises:
   applying a first signal to a first transistor to cause the charge capacitors to be coupled in a serial fashion, and applying a second signal to a second transistor in the switching network to cause the charge capacitors to be coupled in a parallel fashion.

32. The method of claim 28 wherein applying signals to the switching network comprises:
   connecting the output signal from one charge capacitor to the input signal of another charge capacitor.

33. A charge pump capable of having multiple stages, comprising:
   at least two pumping lines, each line including:
   an input terminal for accepting an input voltage,
   an output terminal for delivering an output voltage, the output voltage different than the input voltage,
   a pumping capacitor having a first terminal coupled between the input and output terminals and having a second terminal structured to accept a phase signal, and
   a switch coupled between the input terminal and the output terminal and structured to disrupt a connection between the terminals when activated by a switching signal;
   the charge pump further comprising:
   a switching network structured to couple the pumping lines either in a serial mode or a parallel mode depending on the state of the switching network;
   a control circuit including an optimal stages finder coupled to the switching network; and
   a phase assigner coupled to the optimal stages finder, and comprising a plurality of multiplexing circuits structured to provide configurable phases to adjacent pumping capacitors.

34. A charge pump capable of having multiple stages, comprising:
   at least two pumping lines, each line including:
      an input terminal for accepting an input voltage,
      an output terminal for delivering an output voltage, the output voltage different than the input voltage,
      a pumping capacitor having a first terminal coupled between the input and output terminals and having a second terminal structured to accept a phase signal, and
   a switched diode coupled between the input terminal and the output terminal and structured to disrupt a connection between the terminals when activated by a switching signal, the switched diode comprising:
      an input terminal and an output terminal;
      a first transistor coupled between the input terminal an output terminal;
      a second transistor coupled between the input terminal and a first node and a first capacitor;
      a third transistor coupled between the input terminal and a first node of a second capacitor;
      a fourth transistor coupled between a control gate of the first transistor and a reference voltage; and
      a fifth transistor coupled between the first node of the second transistor and the reference voltage;
   the charge pump further including:
      a switching network coupled between the pumping lines and structured to couple the pumping lines either in a serial mode or a parallel mode depending on a state of the switching network.

35. A charge pump capable of having multiple stages, comprising:
   at least two pumping lines, each line including:
   an input terminal for accepting an input voltage,
   an output terminal for delivering an output voltage, the output voltage different than the input voltage,
   a first pumping capacitor having a first terminal coupled between the input and output terminals and having a second terminal structured to accept a first phase signal, and
   a second pumping capacitor having a first terminal coupled between the input and output terminals and having a second terminal structured to accept a second phase signal, the first and second phase signals being identical to each other, and
   a first switch coupled between the input terminal and the output terminal and structured to disrupt a connection between the input and output terminals when activated by a switching signal;
   a second switch coupled between the input terminal and the output terminal and structured to disrupt a connection between the input and output terminals when activated by a switching signal;
   a third switch coupled between the first terminals of the respective first and second pumping capacitors and structured to disrupt a connection between the first terminals of the capacitors when activated by a switching signal;
   the charge pump further including:
   a switching network structured to couple the pumping lines either in a serial mode or a parallel mode depending on a state of the switching network.

36. A charge pump capable of having multiple stages, comprising:
   at least two pumping lines, each line including;
   an input terminal for accepting an input voltage,
   an output terminal for delivering an output voltage, the output voltage different than the input voltage,
   a first pumping capacitor having a first terminal coupled between the input and output terminals and having a second terminal structured to accept a first phase signal, and
   a second pumping capacitor having a first terminal coupled between the input and output terminals and having a second terminal structured to accept a second phase signal, wherein the relationship between the first phase signal and the second phase signal is controllable by software code to achieve a desired output response from the charge pump, and
   a first switch coupled between the input terminal and the output terminal and structured to disrupt a connection between the input and output terminals when activated by a switching signal;
   a second switch coupled between the input terminal and the output terminal and structured to disrupt a connection between the input and output terminals when activated by a switching signal;

a third switch coupled between the first terminals of the respective first and second pumping capacitors and structured to disrupt a connection between e first terminals of the capacitors when activated by a switching signal;

the charge pump further including:

a switching network structured to couple the pumping lines either in a serial mode or a parallel mode depending on a state of the switching network.

37. A charge pump, comprising:

at least two pumping stages, each pumping stage comprising at least two charge capacitors; and a switching network configured to separately couple and uncouple the at least two charge capacitors to input and output lines such that for any pumping operation, any combination of the at least two charge capacitors may not be used, and the switching network further configured to couple the at least two pump stages in a serial or parallel arrangement.

38. The charge pump of claim 37, wherein the switching network comprises at least five switches.

39. A circuit, comprising:

at least two pumping lines formed of at least two capacitors each; and a plurality of switches configured to couple and uncouple each of the at least two capacitors individually to input and output lines to provide configurable phases between each of the at least two capacitors, and the plurality of switches further configured to configure the at least two pumping lines in serial or parallel arrangements.

* * * * *